United States Patent [19]

Kanazawa et al.

[11] Patent Number: 4,646,867

[45] Date of Patent: Mar. 3, 1987

[54] FOUR-WHEEL STEERING SYSTEM FOR VEHICLE

[75] Inventors: Hirotaka Kanazawa; Teruhiko Takatani; Shigeki Furutani, all of Hiroshima; Isamu Chikuma, Gumma; Satoru Shimada, Gumma; Hiroshi Eda, Gumma, all of Japan

[73] Assignee: Mazda Motor Corporation, Hiroshima, Japan

[21] Appl. No.: 791,106

[22] Filed: Oct. 24, 1985

[30] Foreign Application Priority Data

Oct. 27, 1984 [JP] Japan ................................ 59-226098

[51] Int. Cl.[4] .............................................. B62D 5/06
[52] U.S. Cl. ...................................... 180/140; 74/498; 180/148
[58] Field of Search .................. 180/140, 148; 280/91; 74/498

[56] References Cited

U.S. PATENT DOCUMENTS

| 2,867,284 | 1/1959 | Hruska | 180/148 |
| 3,207,254 | 9/1965 | D'Espinassy | 180/148 X |
| 3,753,375 | 8/1973 | Colletti | 74/498 |

FOREIGN PATENT DOCUMENTS

| 2017603 | 4/1970 | Fed. Rep. of Germany | 74/498 |
| 2730167 | 1/1978 | Fed. Rep. of Germany | 180/148 |
| 58-122256 | 7/1983 | Japan | 180/148 |
| 1074357 | 7/1967 | United Kingdom | 74/498 |

Primary Examiner—John A. Pekar
Attorney, Agent, or Firm—Gerald J. Ferguson, Jr.; Michael P. Hoffman; Ronni S. Malamud

[57] ABSTRACT

A four-wheel steering system comprises a steering wheel; a steering shaft which is connected to the steering wheel to be rotated in response to operation of the steering wheel and is provided with a first pinion fixedly mounted thereon; a rack bar which is supported for sliding motion in the transverse direction of the vehicle body, is provided with a first rack gear in mesh with the first pinion and a second rack gear, and is connected to the right and left front wheels by way of tie rods, a rear wheel turning force taking-out mechanism which includes a second pinion in mesh with the second rack gear on the rack bar and a rod member connected to the second pinion, and which converts the sliding motion of the rack bar into rotation of the rod member; and a rear wheel turning mechanism which is arranged to turn the rear wheels in response to rotation of the rod member. There are provided a first resilient pressing mechanism which presses one of the first and second rack gears, from the rear, towards the pinion in mesh therewith, and a second resilient pressing mechanism which presses the pinion in mesh with the other of the first and second rack gears toward said the other of the first and second rack gears.

11 Claims, 5 Drawing Figures

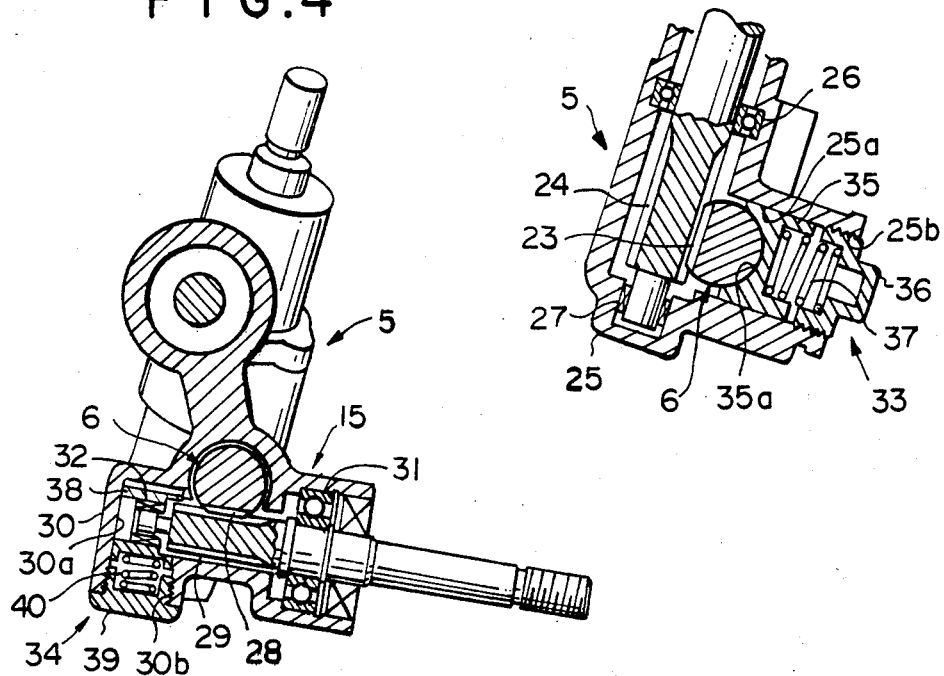
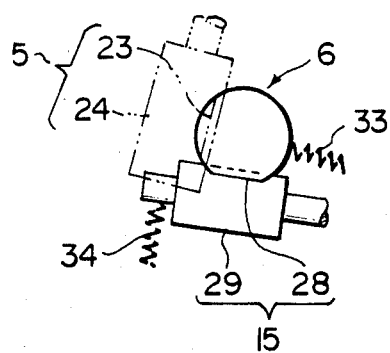

FOUR-WHEEL STEERING SYSTEM FOR VEHICLE

BACKGROUND OF THE INVENTION

1. Field of the Invention

This invention relates to a four-wheel steering system for a vehicle in which both the front and rear wheels are turned in response to operation of the steering wheel.

2. Description of the Prior Art

There has been known a four-wheel steering system for a vehicle which comprises a steering mechanism for turning the front wheels, and a rear wheel turning mechanism for turning the rear wheels, and in which the steering force from the steering mechanism is transmitted to the rear wheel turning mechanism by way of a rod member to turn the rear wheels in response to turning of the front wheels.

In such a four-wheel steering system, the steering mechanism includes a rack bar which extends in the transverse direction of the vehicle and moves tie rods to turn the front wheels, and is provided with a first rack in mesh with a first pinion connected to the steering wheel and a second rack in mesh with a second pinion provided on the front end of the rod member by way of which the steering force is transmitted to the rear wheel turning mechanism.

As an intermesh adjustment mechanism for adjusting the intermesh between the rack and the pinion of each of said rack-and-pinion mechanisms, there has been known one in which the first and second pinions are positioned at a predetermined angle to each other and the rack bar is urged toward the pinions by a pair of resilient pressing means at portions corresponding to the respective rack-and-pinion mechanism, each resilient pressing means comprising a spring and a bearing member, for example. See Japanese Unexamined Patent Publication No. 58(1983)-122256, for example.

However the conventional intermesh adjustment mechanism is disadvantageous in that when intermesh adjustment of one of the rack-and-pinion mechanisms is completed and intermesh adjustment of the other rack-and-pinion mechanism is to be subsequently accomplished, the rack bar is deflected by the pressure from the resilient pressing means and side load is imparted to the bearing member of the resilient pressing means corresponding to said one rack-and-pinion mechanism to press the bearing member against the inner surface of a gear box accommodating it, thereby deforming the bearing member and/or the gear box. Further, if the first and second pinions are disposed at an angle other than 90° due to limitations relating to the layout, the deflection of the rack bar can adversely affect the intermesh between the rack and the pinion of said rack-and-pinion mechanism to require readjustment.

SUMMARY OF THE INVENTION

In view of the foregoing observations and description, the primary object of the present invention is to provide a four-wheel steering system including a pair of rack-and-pinion mechanisms in which intermesh adjustment of each of the rack-and-pinion mechanisms can be accomplished without affecting intermesh adjustment of the other rack-and-pinion mechanism.

In the four-wheel steering systems comprising a steering wheel; a steering shaft which is connected to the steering wheel to be rotated in response to operation of the steering wheel and is provided with a first pinion fixedly mounted thereon; a rack bar which is supported for sliding motion in the transverse direction of the vehicle body, is provided with a first rack gear in mesh with the first pinion and a second rack gear, and is connected to the right and left front wheels by way of tie rods; a rear wheel turning force taking-out means which includes a second pinion in mesh with the second rack gear on the rack bar and a rod member connected to the second pinion, and which converts the sliding motion of the rack bar into rotation of the rod member; and a rear wheel turning means which is arranged to turn the rear wheels in response to rotation of the rod member, the four-wheel steering system in accordance with the present invention is characterized by having a first resilient pressing means which presses one of the first and second rack gears, from the rear, towards the pinion in mesh therewith, and a second resilient pressing means which presses the pinion in mesh with the other of the first and second rack gears toward said the other of the first and second rack gears.

In the four-wheel steering system of the present invention, intermesh adjustment of both the rack-and-pinion mechanisms can be accomplished without mutual interference by first adjusting the intermesh between said one of the first and second rack gears and the pinion in mesh therewith by the first resilient pressing means and then adjusting the intermesh between said the other of the first and second rack gears and the pinion in mesh therewith by the second resilient pressing means.

BRIEF DESCRIPTION OF THE DRAWINGS

FIG. 3 is a cross-sectional view taken along line III—III in FIG. 2, FIG. 4 is a cross-sectional view taken along line IV—IV in FIG. 2, and FIG. 5 is a view schematically showing relative positions of the resilient pressing means and the rack-and-pinion mechanisms.

DESCRIPTION OF THE PREFERRED EMBODIMENT

Figure 1:
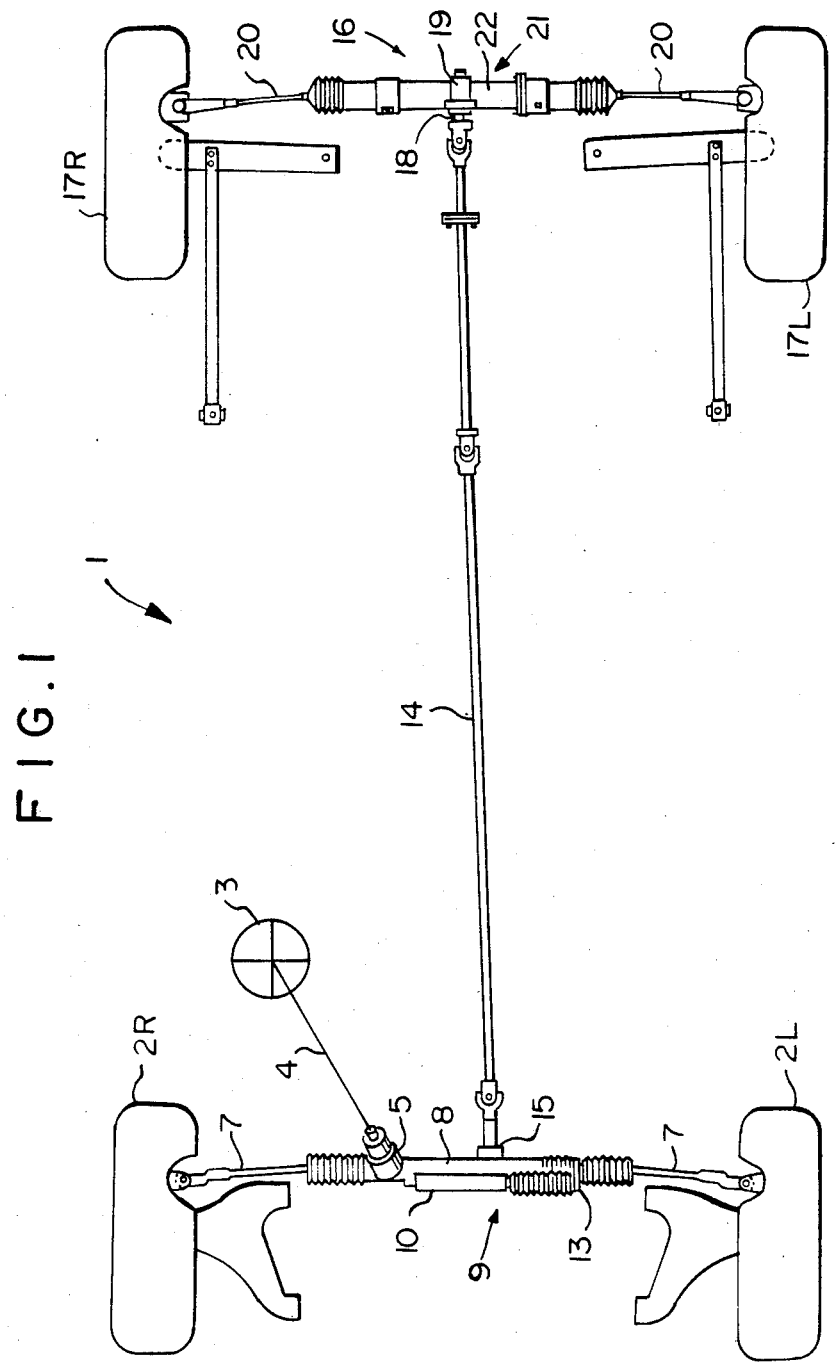
FIG. 1 is a schematic plan view of a four-wheel steering system in accordance with an embodiment of the present invention.
Figure 2:
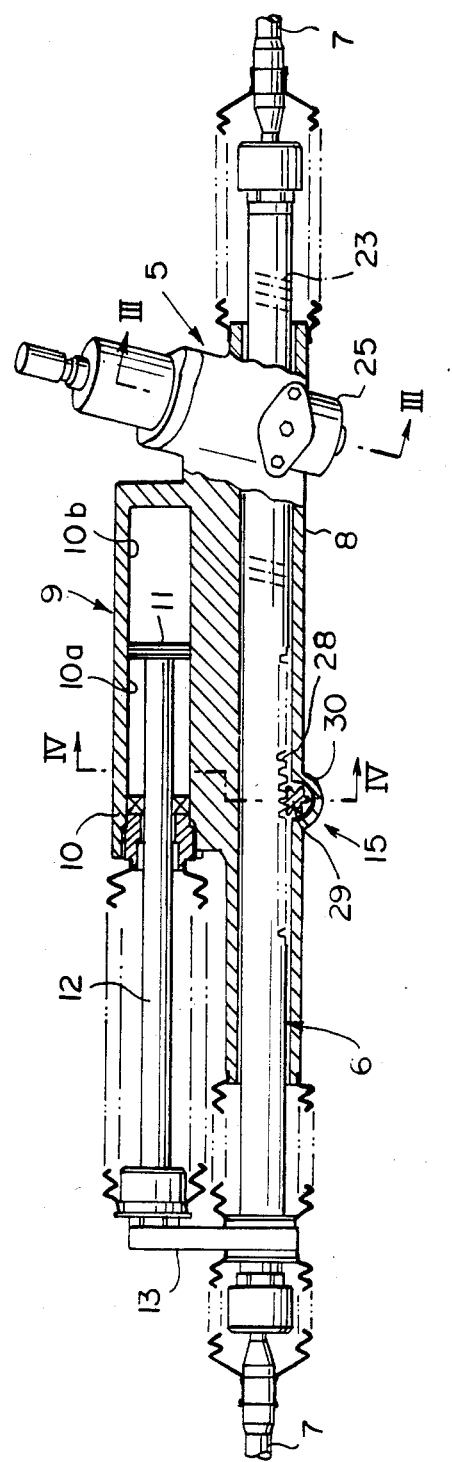
FIG. 2 is a cross sectional view of a mechanism for turning the front wheels employed in the four-wheel steering system of FIG. 1.

In FIGS. 1 and 2, a four-wheel steering system in accordance with an embodiment of the present invention includes steering wheel 3, a steering shaft 4 connected to the steering wheel 3 to be rotated in response to operation of the steering wheel 3, and a rack bar 6 (FIG. 2) operatively connected to the steering shaft 4 by way of a first rack-and-pinion mechanism 5. The rack bar 6 is supported for sliding motion in response to rotation of the steering shaft 4. The rack bar 6 is connected to right and left front wheels 2R and 2L by way of a pair of tie rods 7 to turn the front wheels 2R and 2L in response to the sliding motion thereof.

The rack bar 6 is housed in a rack bar casing 8. A power cylinder mechanism 9 is disposed in parallel to the rack bar casing 8. As clearly shown in FIG. 2, the power cylinder mechanism 9 comprises a cylinder 10 formed integrally with the rack bar case 8, a piston 11 which is received for sliding motion in the cylinder 10 and divides the interior of the cylinder 10 into a left turning oil pressure chamber 10a and a right turning oil pressure chamber 10b, and a piston rod 12 one end of which is connected to the piston 11 and the other end of which projects outward from the left turning oil pressure chamber 10a. The projecting end of the piston rod 12 is connected to a left end portion of the rack bar 6 by way of a connecting member 13. The oil pressure chambers 10a and 10b are connected to an oil pump (not shown) by way of a control valve (not shown) which is operated according to the rotating direction of the steering wheel 3 or the steering shaft 4. That is, the control valve controls oil passages to the oil pressure chambers 10a and 10b so that pressurized oil from the oil pump is fed to the left turning oil pressure chamber 10a and at the same time oil is discharged from the right turning pressure chamber 10b when the steering wheel 3 is turned to the left, and on the other hand, pressurized oil from the oil pump is fed to the right turning oil pressure chamber 10b and at the same time oil is discharged from the left turning pressure chamber 10a when the steering wheel 3 is turned to the right, thereby multiplying the steering effort exerted on the steering wheel 3.

A rod member 14 extends fore and aft along the underside of the vehicle body. The rod member 14 is operatively connected to the rack bar 6 at the front end thereof by way of a second rack-and-pinion mechanism 15 for converting the right and left movement of the rack bar 6 into rotation of the rod member 14, and thus transmits the driver's steering effort to a rear wheel turning mechanism 16 (to be described later).

The rear wheel turning mechanism 16 is for turning right and left rear wheels 17R and 17L and comprises an input shaft 18 connected to the rear end of the rod member 14, a rack bar (not shown) which is connected to the input shaft 18 by way of a third rack-and-pinion mechanism 19 to be moved in the transverse direction of the vehicle body in response to rotation of the input shaft 18, and a pair of tie rods 20 connected to opposite ends of the rack bar to turn the right and left rear wheels 17R and 17L in response to movement of the rack bar in the transverse direction of the vehicle body.

The rear wheel turning mechanism 16 further comprises a power cylinder mechanism 21 and the rack bar for the working rod of the power cylinder mechanism 21. Though not shown in detail, the power cylinder mechanism 21 assists the rotational force of the input shaft 18 in moving the rack bar to turn the rear wheels 17R and 17L under the force of oil pressure which is selectively fed to a left turning oil pressure chamber or a right turning oil pressure chamber formed in a rack bar casing 22 under the control of a control valve as in the power cylinder mechanism 9 shown in FIG. 2.

As shown in FIGS. 2 and 3, the first rack-and-pinion mechanism 5 comprises a first rack gear 23 formed on the rack bar 3 at the end portion near the steering shaft 4 and a first pinion 24 in mesh with the first rack gear 23. The first pinion 24 is connected to the lower end of the steering shaft 4 and is supported for rotation by a pair of bearings 26 and 27 in a gear box 25 formed integrally with the rack bar casing 8.

As shown in FIGS. 2 and 4, the second rack-and-pinion mechanism 15 comprises a second rack gear 28 formed on the rack bar 6 near the middle thereof and a second pinion 29 in mesh with the second rack gear 28. The second pinion 29 is connected to the front end of the rod member 14 and is supported for rotation and for slight sliding movement toward and away from the second rack gear 28 by a pair of bearings 31 and 32 in a gear box 30 formed integrally with the rack bar casing 8. Since the steering shaft 4 and the rod member 14 are not parallel to each other, the first and second pinions 24 and 29 are disposed at an angle to each other. The first and second rack gears 23 and 28 are different from each other in position in the longitudinal direction of the rack bar 6 (the transverse direction of the vehicle body) with the first rack gear 23 facing forward and the second rack gear 28 facing downward.

In order to adjust intermesh between the first rack gear 23 and the first pinion 24, and between the second rack gear 28 and the second pinion 29, first and second resilient pressing means 33 and 34 (FIGS. 3 and 4) are respectively provided. The first resilient pressing means 33 comprises a support yoke 35 which is slidably received in a tubular guide portion 25a (which is in the form of a bore) formed in the gear box 25 and is provided with a recess 35a for mating with the side of the rack bar 6 opposite to the side on which the first rack gear 23 is formed (this side of the rack bar 6 will be referred to as "the rear side", hereinbelow), an adjust plug 36 screwed into a threaded portion 25b of the guide portion 25a, and a spring 37 disposed between the support yoke 35 and the adjust plug 36 to push the rack bar 6 toward the first pinion 24 by way of the support yoke 35. By rotating the adjust plug 36 to advance or retract it so that the urging force exerted on the rack bar 6 from the spring 37 is increased or reduced, intermesh between the first rack gear 23 and the first pinion 24 can be adjusted.

The second resilient pressing means 34 comprises a support yoke 38 which is slidably received in a tubular guide portion 30a (which is in the form of a bore) formed in the gear box 30 and receives the bearing 32 supporting the front end of the second pinion 29 to hold it, an adjust plug 39 screwed into a threaded portion 30b of the guide portion 30a and a spring 40 disposed between the support yoke 38 and the adjust plug 39 to push the second pinion 29 toward the rack bar 6 by way of the support yoke 38 and the bearing 32. By rotating the adjust plug 39 to advance or retract it so that the urging force exerted on the second pinion 29 from the spring 40 is increased or reduced, intermesh between the second rack gear 28 and the second pinion 29 can be adjusted.

Now the procedure for adjusting intermesh between the first rack gear 23 and the first pinion 24 of the first rack-and-pinion mechanism 5 and between the second rack gear 28 and the second pinion 29 of the second rack-and-pinion mechanism 15 by means of the first and second resilient pressing means 33 and 34 will be described with reference to FIG. 5 in which relative positions of the first and second resilient pressing means and the first and second rack-and-pinion mechanisms are schematically shown.

The intermesh between the first rack gear 23 and the first pinion 24 of the first rack-and-pinion mechanism 5 is first adjusted by adjusting the urging force exerted on the rack bar 6 by the spring 37 by rotating the adjust plug 36 of the first resilient pressing means 33. Thereafter, the intermesh between the second rack gear 28 and the second pinion 29 of the second rack-and-pinion mechanism 15 is adjusted by adjusting the urging force exerted on the second pinion 29 by the spring 40 by rotating the adjust plug 39 of the second resilient pressing means 34.

Since the urging force of the second resilient pressing means 34 acts solely on the second pinion 29 and does not act on the rack bar 6, the rack bar 6 cannot be deflected. Therefore, unlike in the four-wheel steering system in accordance with the prior art described above, no side load is imparted to the bearing member (the support yoke 35) of the first resilient pressing means 33 on which the intermesh adjustment has been completed. Accordingly, there is no possibility that the support yoke 35 is pressed against the inner surface of the guide portion 25a of the gear box 25, whereby deformation of the support yoke 35 and the gear box 25 can be prevented and their durability can be improved. Further, even if the first and second pinions 24 and 29 are disposed at an angle other than 90° with each other, the intermesh adjustment operation on the second rack-and-pinion mechanism 15 by the second resilient pressing means 34 cannot affect the intermesh between the first rack gear 23 and the first pinion 24 of the first rack-and-pinion mechanism 5 on which the intermesh adjustment has been completed. Therefore, the intermesh adjustment on the first and second rack-and-pinion mechanism 5 and 15 can be accomplished in a short time.

Further, in the embodiment described above, the rack bar 6 does not form a working part of the power cylinder mechanism 9 for assisting in turning the front wheels 2R and 2L unlike in known power steering mechanisms but is arranged to be assisted in turning the front wheels 2R and 2L by oil pressure which is selectively provided to the left turning oil pressure chamber 10a or the right turning oil pressure chamber 10b and is transmitted to the rack bar 6 by way of the piston rod 12. This arrangement is advantageous in that the intermesh between the first rack gear 23 and the first pinion 24, and between the second rack gear 28 and the second pinion 29 cannot be affected by the oil pressure in the oil pressure chambers 10a and 10b. The power cylinder mechanism 21 of the rear wheel turning mechanism 16 may be of a known type in which the rack bar forms a working part since only one rack-and-pinion mechanism 19 is on the rack bar of the rear wheel turning mechanism 16, and accordingly, the oil pressure in the oil pressure chambers of the power cylinder mechanism 21 can be easily prevented from affecting the intermesh between the rack gear and the pinion of the rack-and-pinion mechanism 19, for instance, by positioning the oil pressure chambers of the power cylinder mechanism 21 at a location removed from the rack-and-pinion mechanism 19.

Though in the above embodiment, the first resilient pressing means 33 is arranged to push the rack bar 6 toward the first pinion 24 and the second resilient pressing means 34 is arranged to push the second pinion 29 toward the rack bar 6, the first and second resilient pressing means 33 and 34 may be respectively arranged to push the first pinion 24 toward the rack bar 6 and to push the rack 6 toward the second pinion 29.

We claim:

1. In a four-wheel steering system for a vehicle comprising a steering wheel; a steering shaft which is connected to the steering wheel to be rotated in response to operation of the steering wheel and is provided with a first pinion fixedly mounted thereon, a rack bar which is supported for sliding motion in the transverse direction of the vehicle body, is provided with a first rack gear in mesh with the first pinion and a second rack gear, and is connected to the right and left front wheels by way of tie rods; a rear wheel turning force taking-out means which includes a second pinion in mesh with the second rack gear on the rack bar and a rod member connected to the second pinion, and which converts the sliding motion of the rack bar into rotation of the rod member; and a rear wheel turning means which is arranged to turn the rear wheels in response to rotation of the rod member, the improvement which comprises a first resilient pressing means which presses the first rack gear, from the rear, towards the pinion in mesh therewith, and a second resilient pressing means which presses the pinion in mesh with the second rack gear toward the second rack gear.

2. A four-wheel steering system as defined in claim 1 in which said rack bar is accommodated in a casing provided with a first bore which extends substantially perpendicularly to the axis of the rack bar to open to the outside behind said one rack gear, and a second bore which extends substantially perpendicularly to the axis of the rack bar to open to the outside at a portion opposed to a front end portion of the pinion in mesh with said the other rack gear, said first resilient pressing means comprising a first support member which is received in the first bore for sliding motion therealong and is adapted to abut against the rear side of the rack bar, a first adjust member which is screwed into the outer portion of the first bore to close it, and a spring member disposed between the first support member and the first adjust member to be compressed therebetween, and the second resilient pressing means comprising a second support member which is received in the second bore for sliding motion therealong and supports the front end portion of the pinion in mesh with said the other rack gear, a second adjust member which is screwed into the outer portion of the second bore to close it, and a spring member disposed between the second support member and the second adjust member to be compressed therebetween.

3. A four-wheel steering system as defined in claim 2 in which the surface of said first support member abutting against the rear side of the rack bar is concaved to conform with the shape of the rear side of the rack bar.

4. A four-wheel steering system as defined in claim 2 in which the axes of the first and second pinions form therebetween an angle other than 90°.

5. A four-wheel steering system as defined in claim 2 in which said first resilient pressing means presses the first rack gear, from the rear, towards the first pinion in mesh therewith, and the second resilient pressing means presses the second pinion in mesh therewith, and the second resilient pressing means pressess the second pinion toward the second rack gear.

6. A four-wheel steering system as defined in claim 2, further comprising a power-assist means comprising a cylinder extending substantially in parallel to the rack bar, a piston member slidably received in the cylinder to divide the interior of the cylinder into right and left power chambers, a piston rod which is connected to the piston and extends substantially in parallel to the rack bar, and a connecting member connecting the free end of the piston rod and the rack bar.

7. A four-wheel steering system as defined in claim 1 in which the axes of the first and second pinions form therebetween an angle other than 90°.

8. A four-wheel steering system as defined in claim 1 in which said first resilient pressing means presses the first rack gear, from the rear, towards the first pinion in mesh therewith, and the second resilient pressing means presses the second pinion toward the second rack gear.

9. A four-wheel steering system as defined in claim 1 further comprising a power-assist means comprising a cylinder extending substantially in parallel to the rack bar, a piston member slidably received in the cylinder to divide the interior of the cylinder into right and left power chambers, a piston rod which is connected to the piston and extends substantially in parallel to the rack bar, and a connecting member connecting the free end of the piston rod and the rack bar.

10. A four-wheel steering system as defined in claim 9 in which said rack bar is accommodated in a casing and said cylinder is formed integrally with the casing.

11. In a four-wheel steering system for a vehicle comprising a steering wheel; a steering shaft which is connected to the steering wheel to be rotated in response to operation of the steering wheel and is provided with a first pinion fixedly mounted thereon, a rack bar which is supported for sliding motion in the transverse direction of the vehicle body, is provided with a first rack gear in mesh with the first pinion and a second rack gear, and is connected to the right and left front wheels by way of tie rods; a rear wheel turning force taking-out means which includes a second pinion in mesh with the second rack gear on the rack bar and a rod member connected to the second pinion, and which converts the sliding motion of the rack bar into rotation of the rod member; and a rear wheel turning means which is arranged to turn the rear wheels in response to rotation of the rod member, the improvement which comprises a first resilient pressing means which presses one of the first and second rack gears, from the rear, towards the pinion in mesh therewith, and a second resilient pressing means which presses the pinion in mesh with the other of the first and second rack gears towards said the other of the first and second rack gears, said rack bar being accommodated in a casing provided with a first bore which extends substantially perpendicularly to the axis of the rack bar to open to the outside behind said one rack gear, and a second bore which extends substantially perpendicularly to the axis of the rack bar to open to the outside at a portion opposed to a front end portion of the pinion in mesh with said the otehr rack gear, said first resilient pressing means comrising a first support member which is received in the first bore for sliding motion therealong and is adapted to abut against the rear side of the rack bar, a first adjust member which is screwed into the outer portion of the first bore to close it, and a spring member disposed between the first support member and the first adjust member to be compressed therebetween, and the second resilient pressing means comprising a second support member which is received in the second bore for sliding motion therealong and supports the front end portion of the pinion in mesh with said the other rack gear, a second adjust member which is screwed into the outer portion of the second bore to close it, and a spring member disposed between the second support member and the second adjust member to be compressed therebetween.

* * * * *

UNITED STATES PATENT AND TRADEMARK OFFICE
CERTIFICATE OF CORRECTION

PATENT NO. : 4,646,867
DATED : March 3, 1987
INVENTOR(S) : Kanazawa et al.

It is certified that error appears in the above-identified patent and that said Letters Patent is hereby corrected as shown below: ON TITLE PAGE:

[73] Assignee: Mazda Motor Corporation,
    Hiroshima-ken, Japan, and
    Nippon Seiko Kabushiki Kaisha,
    Tokyo, Japan Signed and Sealed this Eighth Day of October, 1991

*Attest:*

HARRY F. MANBECK, JR.

*Attesting Officer*      *Commissioner of Patents and Trademarks*